United States Patent
Smith, III et al.

(10) Patent No.: US 10,623,382 B2
(45) Date of Patent: Apr. 14, 2020

(54) CREATING AND UTILIZING BLACK KEYS FOR THE TRANSPORT LAYER SECURITY (TLS) HANDSHAKE PROTOCOL AND METHOD THEREFOR

(71) Applicant: Cyphre, LLC, Austin, TX (US)

(72) Inventors: Townsend J. Smith, III, McKinney, TX (US); Vihar R. Rai, Cedar Park, TX (US); Benjamin M Collins, Williamsburg, VA (US)

(73) Assignee: CYPHRE SECURITY SOLUTIONS, LLC, Houston, TX (US)

( * ) Notice: Subject to any disclaimer, the term of this patent is extended or adjusted under 35 U.S.C. 154(b) by 0 days.

(21) Appl. No.: 15/738,567

(22) PCT Filed: Jun. 22, 2016

(86) PCT No.: PCT/US2016/038749
§ 371 (c)(1),
(2) Date: Dec. 20, 2017

(87) PCT Pub. No.: WO2016/209950
PCT Pub. Date: Dec. 29, 2016

(65) Prior Publication Data
US 2018/0191691 A1    Jul. 5, 2018

Related U.S. Application Data

(60) Provisional application No. 62/182,700, filed on Jun. 22, 2015.

(51) Int. Cl.
*H04L 29/06* (2006.01)
*H04L 29/08* (2006.01)
(Continued)

(52) U.S. Cl.
CPC ........ *H04L 63/0435* (2013.01); *G06F 21/606* (2013.01); *H04L 9/0822* (2013.01);
(Continued)

(58) Field of Classification Search
CPC ......... H04L 63/0435; H04L 9/14; H04L 9/30; H04L 63/166; H04L 9/3268;
(Continued)

(56) References Cited

U.S. PATENT DOCUMENTS 6,598,161 B1 * 7/2003 Kluttz ................. G06F 21/6209
713/166
6,633,963 B1 * 10/2003 Ellison ................ G06F 12/1441
711/152
(Continued)

OTHER PUBLICATIONS

Extended European Search Report dated Feb. 4, 2019, issued by the European Patent Office in corresponding European Application No. 16815215.5-1213, (10 pages).

*Primary Examiner* — David J Pearson
*Assistant Examiner* — Badri Narayanan Champakesan
(74) *Attorney, Agent, or Firm* — Buchanan, Ingersoll & Rooney PC

(57) ABSTRACT

A non-transitory computer-readable medium comprising a black zone and a plurality of other electronic components for protecting a data exchange from a malicious attack on the data, that when executed on a processor, perform the steps comprising receiving a client hello message from a client, transmitting a server hello message, receiving a pre-master secret message encrypted with a server public key, storing the pre-master secret, protecting the black zone from malicious attacks on data by isolating hardware of the black zone from the plurality of other electronic components, calculating a master secret in the black zone, storing the master secret as a black key in the black zone, receiving a changed cipher specification and finished message encrypted with a
(Continued)

session key, and transmitting a finished message encrypted with a symmetric key. The server hello message comprises a certificate.

18 Claims, 3 Drawing Sheets

(51) Int. Cl.
   *G06F 21/60* (2013.01)
   *H04L 9/08* (2006.01)
   *H04L 9/14* (2006.01)
   *H04L 9/30* (2006.01)
   *H04L 9/32* (2006.01)

(52) U.S. Cl.
   CPC .......... *H04L 9/0841* (2013.01); *H04L 9/0869* (2013.01); *H04L 9/14* (2013.01); *H04L 9/30* (2013.01); *H04L 9/3242* (2013.01); *H04L 9/3268* (2013.01); *H04L 29/06* (2013.01); *H04L 63/1416* (2013.01); *H04L 63/166* (2013.01); *H04L 67/14* (2013.01); *H04L 67/42* (2013.01); *G06F 2221/2107* (2013.01)

(58) Field of Classification Search
   CPC . H04L 63/1416; H04L 9/0822; H04L 9/3242; H04L 9/0869; H04L 9/0841; H04L 67/14; H04L 67/42; H04L 29/06; G06F 21/606; G06F 2221/2107
   USPC ........................................................ 713/151
   See application file for complete search history.

(56) References Cited

U.S. PATENT DOCUMENTS

| | | | | |
|---|---|---|---|---|
| 8,813,247 | B1* | 8/2014 | Alten | G06F 21/31 380/45 |
| 8,966,267 | B1* | 2/2015 | Pahl | H04L 9/0844 713/171 |
| 8,996,873 | B1* | 3/2015 | Pahl | H04L 63/061 713/173 |
| 9,553,856 | B2* | 1/2017 | Pahl | H04L 9/0825 |
| 2002/0080958 | A1* | 6/2002 | Ober | G06F 8/60 380/44 |
| 2005/0184145 | A1* | 8/2005 | Law | G06Q 20/0855 235/380 |
| 2010/0027788 | A1* | 2/2010 | Tkacik | H04L 63/06 380/46 |
| 2010/0132048 | A1* | 5/2010 | Hall | G06F 21/78 726/27 |
| 2010/0158247 | A1* | 6/2010 | Hopkins | H04L 9/088 380/44 |
| 2013/0191632 | A1* | 7/2013 | Spector | H04L 9/083 713/155 |
| 2014/0247938 | A1* | 9/2014 | Desmicht | H04L 9/0861 380/44 |
| 2015/0039890 | A1* | 2/2015 | Khosravi | H04L 9/0841 713/171 |
| 2015/0288679 | A1* | 10/2015 | Ben-Nun | H04L 67/141 726/10 |

* cited by examiner

- PRIOR ART -

CREATING AND UTILIZING BLACK KEYS FOR THE TRANSPORT LAYER SECURITY (TLS) HANDSHAKE PROTOCOL AND METHOD THEREFOR

RELATED APPLICATIONS

This application claims the benefit under 35 U.S.C. § 119(e) of U.S. Provisional Patent Application Ser. No. 62/182,700 titled Method for Creating and Utilizing Black Keys for the Transport Layer Security (TLS) Handshake Protocol filed Jun. 22, 2015, the content of which is incorporated herein by reference in its entirety.

FIELD

This disclosure relates generally to cyber security, and more specifically to utilizing black keys for data exchange.

BACKGROUND

Transportation Layer Security (hereinafter referred to as "TLS") is a dominant security handshake mechanism used on the internet. TLS involves a handshake protocol which ultimately yields a common "Master Secret" that is shared between two participants on a link, server and client. This "Master Secret" is important because it is used to protect the entire conversation between the server and client. The master secret is a target of attack, even after the conversation is long past, recovery of the master secret would allow decoding of an encrypted conversation which had been logged/stored. A method for protection of the master secret, even from undesirable users with privileged access, is desirable.

SUMMARY

With the above in mind, embodiments of the present invention are related to utilizing black keys for security in handshake protocol. These and other features, objectives and advantages of the present invention are provided by a non-transitory computer-readable medium comprising a black zone and a plurality of other electronic components for protecting a data exchange from a malicious attack on the data, that when executed on a processor, perform the steps comprising receiving a client hello message from a client, transmitting, to the client, a server hello message, receiving, from the client, a pre-master secret message encrypted with a server public key, storing the pre-master secret, protecting the black zone from malicious attacks on data by isolating hardware of the black zone from the plurality of other electronic components, calculating, using the pre-master secret, a master secret in the black zone, storing the master secret as a black key in the black zone, receiving, from the client, a changed cipher specification and finished message encrypted with a session key, and transmitting, to the client, a finished message encrypted with a symmetric key. The server hello message comprises a certificate.

In other embodiments, the present invention may include a non-transitory computer-readable medium comprising a black zone and a plurality of other electronic components for protecting a data exchange from a malicious attack on the data, that when executed on a processor comprising a dedicated security engine, perform the steps comprising receiving a client hello message from a client, transmitting, to the client, a server hello message, receiving, from the client, a pre-master secret message encrypted with a server public key, storing the pre-master secret in the black zone, protecting the black zone from malicious attacks on data by isolating hardware of the black zone from the plurality of other electronic components, calculating, using the pre-master secret, a master secret in the black zone, storing the master secret as a black key in the black zone, generating a key encryption key using a true random number generator, encrypting the black key using the key encryption key, receiving, from the client, a changed cipher specification and finished message encrypted with a session key, and transmitting, to the client, a finished message encrypted with a symmetric key. The server hello message comprises a certificate. All cryptographic computations are performed in the black zone.

In yet other embodiments, the present invention may include a computer-implemented method for protecting a data exchange from a malicious attack on the data, comprising executing on a processor the steps comprising receiving a client hello message from a client, transmitting, to the client, a server hello message, receiving, from the client, a pre-master secret message encrypted with a server public key, storing the pre-master secret in a black zone, protecting the black zone from malicious attacks on data by isolating hardware of the black zone, calculating, using the pre-master secret, a master secret in the black zone, storing the master secret as a black key in the black zone, receiving, from the client, a changed cipher specification and finished message encrypted with a session key, and transmitting, to the client, a finished message encrypted with a symmetric key. The server hello message comprises a certificate.

Figure 1:
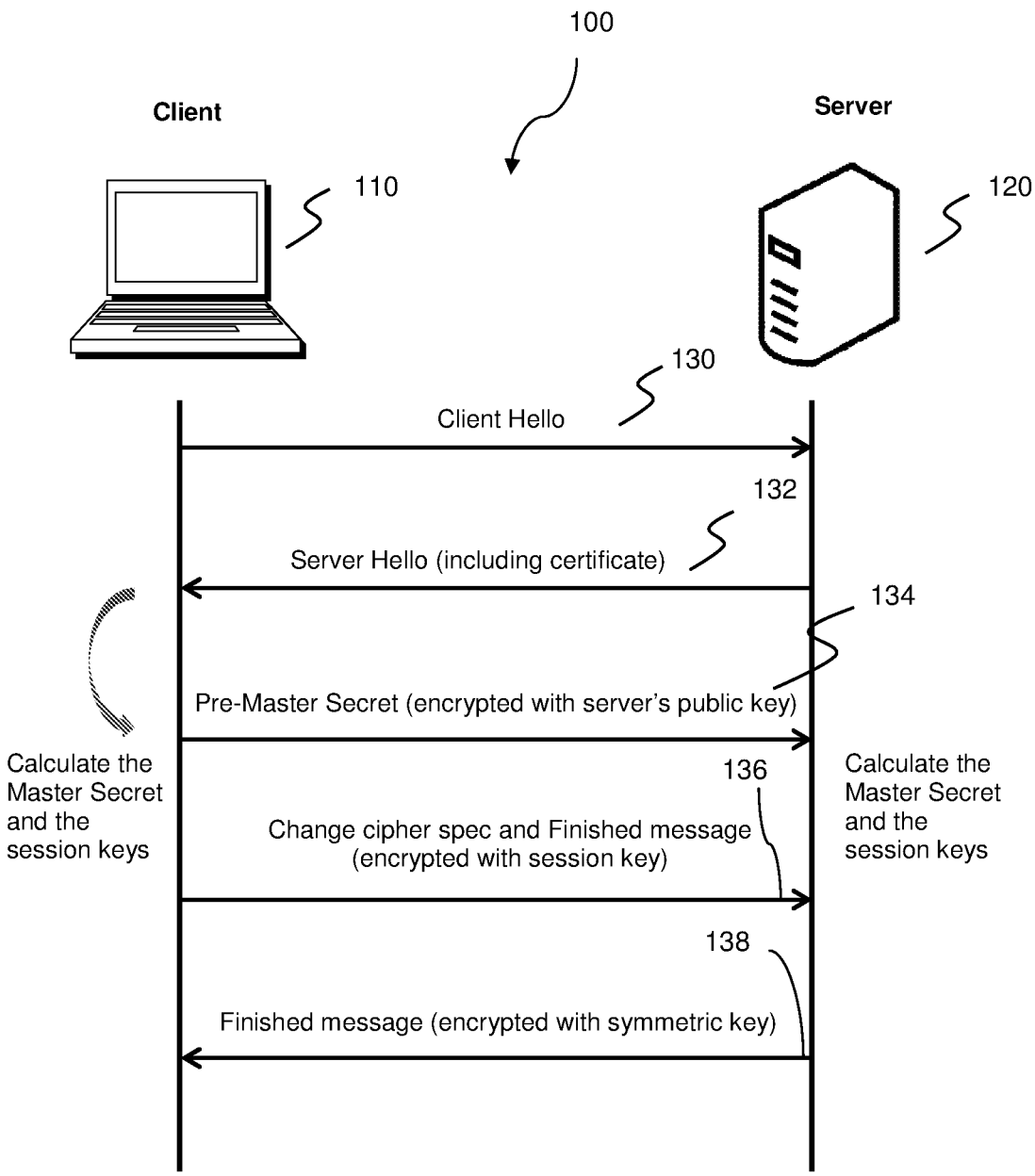
FIG. 1 illustrates in schematic form a standard handshake protocol according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

FIG. 1 illustrates in schematic form a standard handshake protocol 100 according to the prior art. The handshake protocol 100 may comprise transmission between a client 110 and a server 120. In one embodiment, the client 110 may initiate the handshake protocol by sending a Client Hello message 130. The Client Hello message 130 may comprise a random value and a list of supported cipher suites. The server 120 may respond with a Server Hello message 132. The Server Hello message 132 may comprise a random value and a certificate. The client 110 may create a random Pre-Master Secret and encrypt the Pre-Master Secret with a public key from the certificate sent by the server 120. The client 110 may then transmit a Pre-Master Secret message 134 to the server 120. The server 120 and the client 110 may then generate a Master Secret and session keys based upon the Master Secret. The client 110 may then send a Change Cipher Specification and Client Finished message 136. The server 120 receives the Change Cipher Specification and Client Finished message 136 and may switch security to use the session keys and encryption protocol in response. The server 120 may then send a Server Finished message 138 which may complete the handshake protocol. In one embodiment, the handshake protocol of FIG. 1 may represent a Transport Layer Security (hereinafter referred to as "TLS") handshake protocol.

The server 120 may be any network, device, or combination of devices configured to provide a client session. The server 120 may comprise a plurality of storage devices that may store content requested by clients. The server 120 may comprise a plurality of routers, servers, bridges, switches, and combinations of such devices that provide connectivity between the server 120 and the client 110. The client 110 may implement a device to interact with the serve 120. The device may comprise a variety of devices, such as personal computers, cellular phones, tablets, laptops, televisions, gaming consoles, and/or other devices with a processor.

TLS is one of the dominant security handshake protocols in use on the internet. The TLS handshake protocol ultimately yields a common Master Secret that is shared between two participants on a link (server and client). The Master Secret is important because it is used to protect an entire conversation between a server and client. The Master Secret is a target of malicious attack. Even after the conversation is complete, recovery of the Master Secret would allow decoding of an encrypted conversation which had been logged and stored. Vulnerabilities in software, how TLS is primarily implemented, allow keys to become compromised therefore compromising data. Recently, the Heartbleed vulnerability allowed an aggressor to obtain snapshots of memory. The snapshots of memory could reveal keys that were stored in memory in plain-text.

Figure 2:
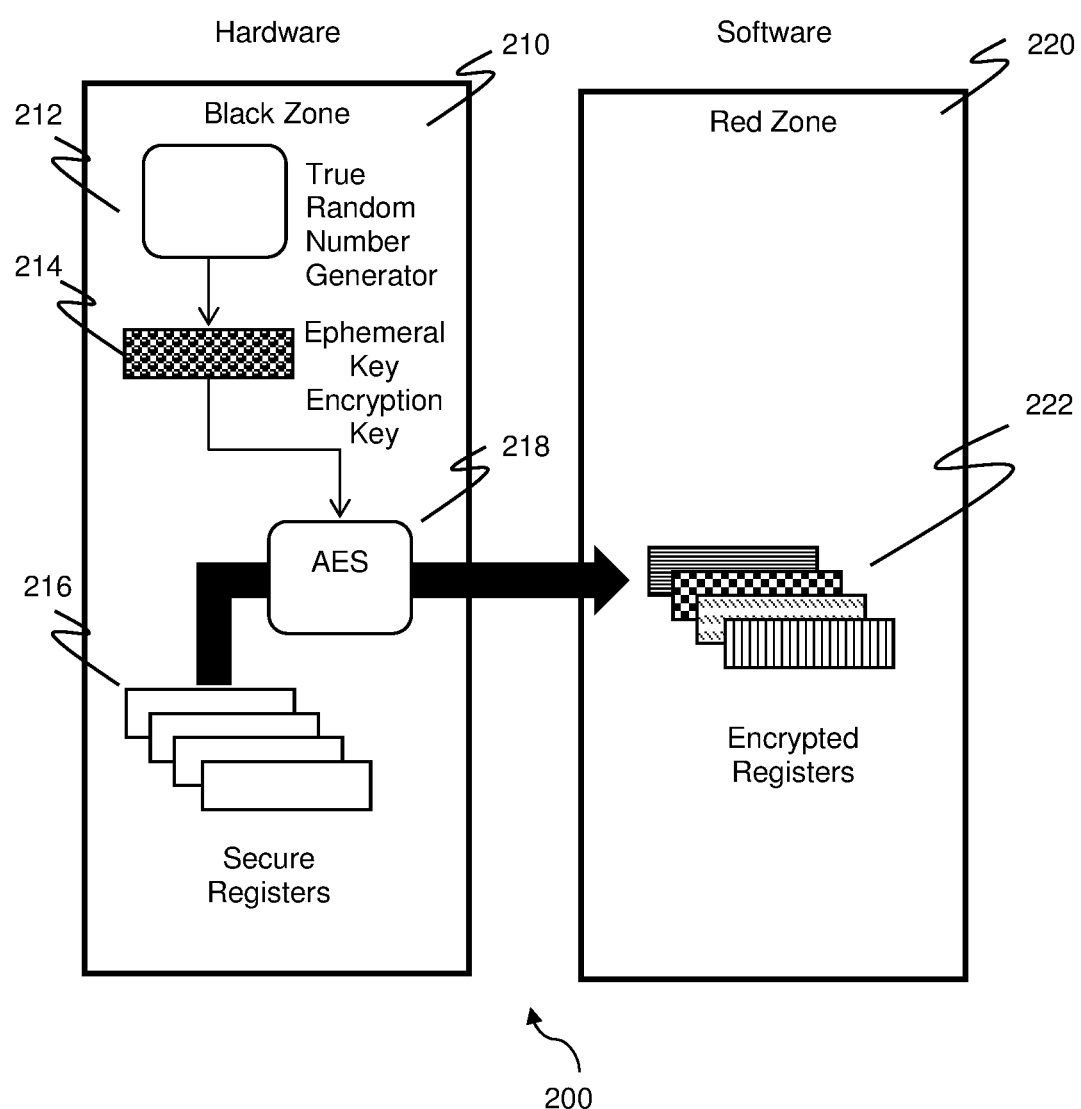
FIG. 2 illustrates in schematic form a red and black signal architecture of a server according to some embodiments.

FIG. 2 illustrates in schematic form a red and black signal architecture of a server 200 according to some embodiments. The server comprises a black zone 210 and a red zone 220. The black zone comprises a true random number generator 212, secure registers 216, and an encryption/decryption engine 218. The red zone comprises encrypted registers 222. In cryptographic systems, encrypted information is referred to as black signals. Signals that comprise sensitive information (non-encrypted) are referred to as red signals. A black key is a key that has been encrypted with a key encryption key and is therefore protected.

In one embodiment, the black zone 210 comprises a cryptography engine implemented in hardware that does not expose unencrypted information to other portions of the server 200. As a result, information in the black zone 210 is substantially never exposed to system software or malicious access. All cryptographic operations occur in the hardware implemented black zone 210. The true random number generator 212 generates a key encryption key 214. The key encryption key 214 comprises an ephemeral key which may be generated after system reset. The key encryption key 214 may be used for encrypting information that may be exposed to the red zone 220. The secure registers 216 of the black zone 210 are configured to be in the hardware implementation of the black zone 210. The secure registers 216 may not be accessed external to the hardware implementation of the black zone 210. The encryption/decryption engine 218 may be used to provide protection for information in the black zone 210. The encrypted registers 222 of the red zone 220, if accessed for any reason, may be shown in a protected (encrypted) format.

Unlike the handshake protocol 100 of FIG. 1, the hardware implementation of the black zone 210 dramatically increases protection of a Master Secret. Hardware offload engines are enabled and integrated functionally up to an end user software application layer. This hardware protection performs cryptographic operations and may specifically be configured to protect keys in its secure registers 216. The hardware implementation may comprise a security engine, security fuses, and a one-time-programmable master key (hereinafter referred to as "OTPMK"). Boot firmware, user space libraries and kernel modules may also be required which may enable and connect the hardware implementation. One example of the firmware is U-Boot with secure boot features enabled and fuse programming capabilities included. An operating system (hereinafter referred to as "OS") layer, a custom secure shell (hereinafter referred to as "SSH") and an open secure sockets layer (hereinafter referred to as "Open SSL") may additionally be implemented in some embodiments. Linux may be an implemented OS layer, however, one of ordinary skill in the art will appreciate that a plurality of OS's exist and would not distinguish from the disclosure discussed herewithin. Open SSL libraries and CryptoDev kernel modules for secure communication may also be implemented. One of ordinary skill in the art will appreciate that the handshake protocol 100 may be used with a plurality of protocols such as, but not limited to, Simple Mail Transfer Protocol, Lightweight Directory Access Protocol, secure Post Office Protocol, secure Internet Message Access Protocol, and secure File Transfer Protocol. Use of the handshake protocol 100 with a unique protocol will not distinguish over the disclosure discussed herewithin.

The OTPMK may allow the hardware implementation to transition to secure modes of operation. The OTPMK may need to be fused into the security engine. The firmware may need to be signed with a private component of a super root key pair and a super root key hash may be stored with an image of the firmware for validation. Each time the server 210 boots, the image of the firmware may be validated to assure correctness and that the image has not been modified. Then, the hardware implementation may boot into the secure mode and properly use the security engine. Once in secure mode, the OS may boot. The booting of the OS may be a fully secure bootstrap with each layer signed and validated by keys in a previous layer. Once the OS is booted, the Open SSL libraries may be available. The libraries may be heavily modified to enable applications to achieve functional use of a low level hardware security engine. After boot up, however, the key encryption key 214 may replace the OTPMK for encryption purposes.

In one embodiment, the server 210 may comprise a Cyphre™ BT-1 server. The server 210 may comprise a QorIQ family processor which may have a built in hardware cryptographic accelerating and offloading engine (for example, SEC engine or Cryptographic Acceleration and Assurance Module (hereinafter referred to as "CAAM")). The server 210 may boot into secure boot mode. The server may be running Linux OS as sole OS or as a virtual machine. An application code may use Apache web server as its backend. Apache uses Open SSL as a provider of TLS services. Open SSL may use a set of application programming interface (hereinafter referred to as "API") calls provided by CryptoDev that may call the SEC driver that talks to SEC hardware.

Figure 3:
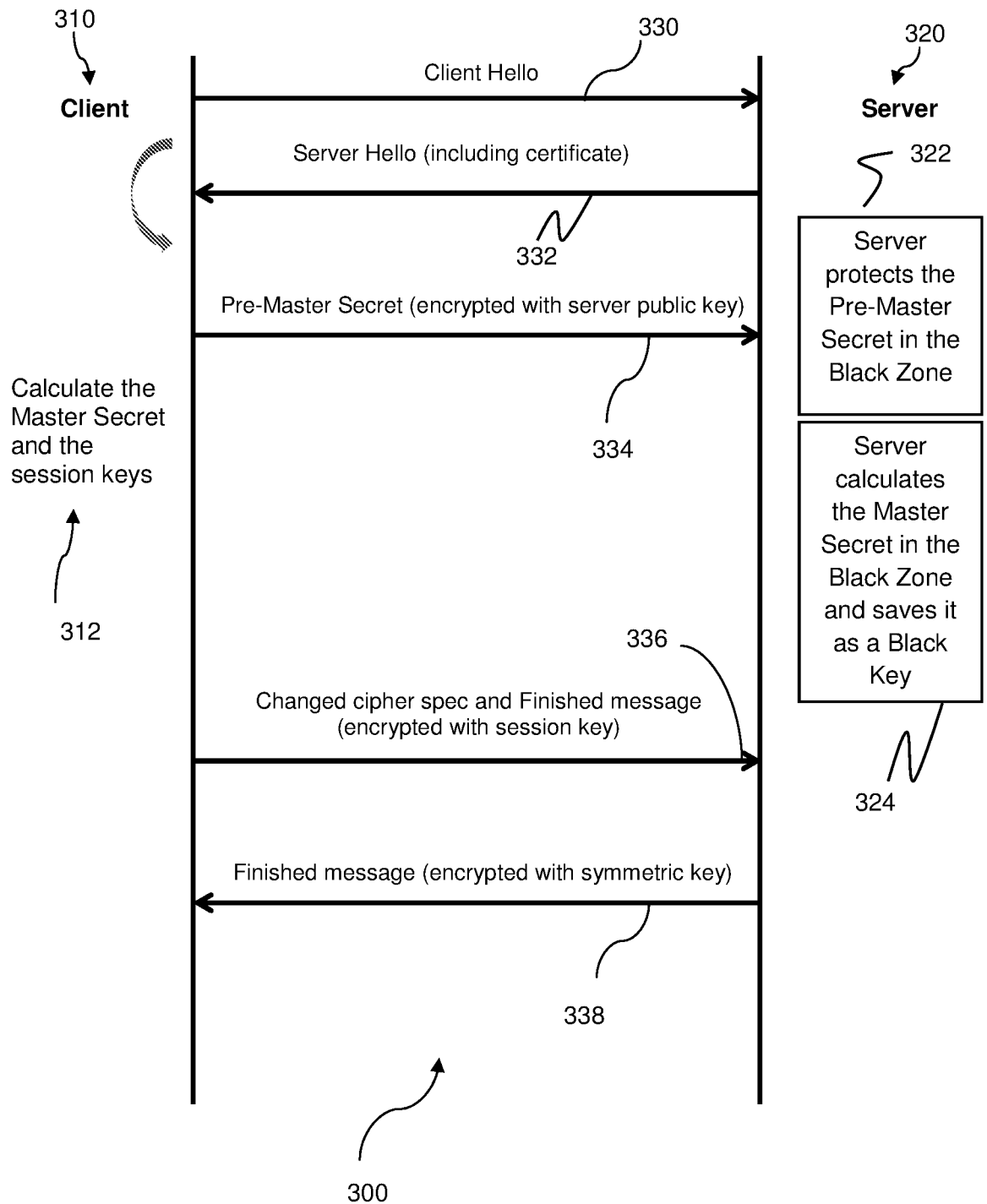
FIG. 3 illustrates in schematic form a handshake protocol with black keys according to some embodiments.

FIG. 3 illustrates in schematic form a handshake protocol 300 with black keys according to some embodiments. The handshake protocol 300 may comprise transmissions between a client 310 and a server 320. The server 320 comprises a black zone 324. In one embodiment, the client 310 may initiate the handshake protocol by sending a Client Hello message 330. The Client Hello message 330 may comprise a random value and a list of supported cipher suites. The server 320 may respond with a Server Hello message 332. The Server Hello message 332 may comprise a random value and a certificate. The client 310 may create a random Pre-Master Secret and encrypt the Pre-Master Secret with a public key from the certificate sent by the server 320. The client 310 may then transmit a Pre-Master Secret message 334 to the server 320. The client 310 may be passive 312 during generation of a Master Key. The server 320 generates a Master Secret 322, calculated in the black zone 324, therefore protecting the Master Secret 322. The client 310 may then send a Change Cipher Specification and Client Finished message 336. The server 320 receives the Change Cipher Specification and Client Finished message 336 and may switch security to use the session keys and encryption protocol in response. The server 320 may then send a Server Finished message 338 which may complete the handshake protocol.

In operation, handshake protocol 300 provides added security to the Master Secret 322 and the session by performing all cryptographic operations in a hardware implemented black zone 324. Handshake protocol 300 may operate substantially the same as handshake protocol 100 of FIG. 1. However, unlike handshake protocol 100, handshake protocol 300 is utilizing black key technology, implemented in hardware, to provide an additional layer of protection to a session with the client 310.

In one embodiment, when invoked, the Open SSL libraries may create a TLS sessions using hardware based resources for all server 320 side steps of a TLS handshake. The steps may comprise generating a random number, creating a pre-master secret with a pseudo-random function, and protection a master secret and secrets derived from the master secret. Once the TLS session is created, the Master Secret 322 key may be protected by security hardware. The Master Secret 322 key may be encrypted using an ephemeral master key and may never be made available to any external system. Standard Open SSL library calls may be implemented as well as their corresponding protection.

The handshake protocol 300 may use a processor of the server's 320 hardware based security engine or cryptographic acceleration engine which may encrypt or decrypt data internal to the processor with a blackened session key. When the session key needs to be stored in memory, they may be encrypted with a key encryption key and then stored in encrypted form. Substantially no keys may be compromised even in scenarios where software may become compromised. The key encryption key may always be within the processors security module and without substantially large cost, time and equipment, become substantially impossible to compromise. After the server 320 is powered on and in a secure mode, the security module of the processor may use a hardware based true random number generator to create a 256-bit random number which may be stored in secure registers in the processor and used as a key encryption key that may protect all black TLS session keys until a next power cycle event. When a remote client initiates a TLS session, a handshake protocol initiates. After Hello stages and a certification authentication stage, the session key may be established that will be used as a black key for encryption and decryption during the TLS session. When a shared secret or black key between the server 320 and client 310 is created and established, any encryption or decryption request, during a date exchange phase, by upper layers, may be performed within an SEC engine with the black key. If the session may need to be suspended, or during wait cycles, the key is encrypted or blacked and put in to memory until it is ready to be used again. The key may be encrypted or blackened with an Advanced Encryption Standard (hereinafter referred to as "AES") 256 encryption using the key encryption key. When data may need to be transmitted or received again on the server 320 for that session. The key for that session, which may be encrypted form in memory, is pulled into the SEC engine and unencrypted. The unencrypted key may then be used to encrypt and decrypt data inside the SEC engine. Neither the SEC engine nor the key is readable by any means outside of slicing the processor. When the session is complete, the key may be discarded. If the session needs to pause or if a connection is kept alive, hardware blackens the key and pushes it to memory to make room for other active connections. In addition, since the keys are encrypted with an AES 256 block cipher, the encrypted version could be bigger than the original key as it is padded to a next full block size. This increased size of the encrypted version may have an effect that an aggressor may not be able to ascertain the size of the keys from data in memory.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-transitory computer-readable medium encoded with instructions for executing a method of protecting a data exchange on a network from malicious attack, the method when executed by a computing device configured with at least a black zone and a plurality of other electronic components, causes the computing device to perform the steps comprising:
    receiving a client hello message from a client;
    transmitting, to the client, a server hello message, wherein the server hello message comprises a certificate;
    receiving, from the client, a pre-master secret message including a premaster secret value encrypted with a server public key;
    storing the pre-master secret value in memory;
    protecting the black zone in the computing device from malicious attacks on data by isolating hardware of the black zone from other electronic components of the computing device, wherein the hardware of the black zone including at least a cryptography engine;
    calculating, using the pre-master secret value, a master secret in the cryptography engine of the black zone, wherein the master secret is a first session key of a first security operating mode of the computing device;
    storing the master secret as a black key in memory of the black zone;
    performing any encryption or decryption operation in the black zone using the black key;
    receiving, from the client, a changed cipher specification and a client finished message encrypted with a second session key associated with a second security operating mode of the computing device;
    generating a symmetric key for the second security operating mode of the computing device; and
    encrypting the black key in the black zone when the first session associated with the first security operating mode is suspended;
    storing the encrypted black key in the memory of the black zone until the first session of the first security operating mode is resumed; and
    transmitting, to the client, a server finished message encrypted with the symmetric key in the first security operating mode of the computing device.

2. The non-transitory computer-readable medium of claim 1 wherein the further encrypting the black key comprises:
    generating a key encryption key using a true random number generator; and
    encrypting the black key using the key encryption key.

3. The non-transitory computer-readable medium of claim 2 wherein the key encryption key is zeroized in response to a defined security violation.

4. The non-transitory computer-readable medium of claim 2 wherein the true random number generator is run in software with a seed for the true random number generator obtained in hardware.

5. The non-transitory computer-readable medium of claim 1 wherein the pre-master secret is stored in memory in the black zone.

6. The non-transitory readable medium of claim 1 wherein the black zone is initialized and verified before boot time using a super root key hash.

7. The non-transitory computer-readable medium of claim 1 wherein the processor includes a dedicated security engine.

8. The non-transitory computer-readable medium of claim 7 wherein the data exchange during the first security mode and the second-security mode each occur during transport layer security sessions.

9. A non-transitory computer-readable medium encoded with instructions for protecting a data exchange on a network from malicious attack, when executed on a computing device including at least a dedicated security engine, a black zone, and a plurality of other electronic components, causes the computing device to perform the comprising:
    receiving a client hello message from a client; transmitting, to the client, a server hello message, wherein the server hello message comprises a certificate;
    receiving, from the client, a pre-master secret message including a pre-master secret value and encrypted with a server public key;
    storing the pre-master secret value in memory of the black zone;
    protecting the black zone from malicious attacks on data by isolating hardware of the black zone from the plurality of other electronic components;
    calculating, using the pre-master secret value, a master secret in the black zone, wherein the master secret is a first session key for use in a first security operating mode of the computing device;
    storing the master secret as a black key in the memory of the black zone;
    performing any encryption or decryption operation during the first security operating mode in the black zone using the black key;
    receiving, from the client, a changed cipher specification and a client finished message encrypted with a second session key for a second security operating mode of the computing device;

encrypting the black key using a key encryption key when the first session associated with the first security operating mode is suspended;

storing the encrypted black key in the memory of the black zone until the first session of the first security operating mode is resumed; and transmitting, to the client, a server finished message encrypted with a symmetric key for the second security mode of the computing device.

10. The non-transitory computer-readable medium of claim 9 further comprising switching security protocols to use the second session key in the second security operating mode in response to receiving the changed cipher specification and client finished message.

11. The non-transitory computer-readable medium of claim 9 wherein the one or more secure registers of the black zone are configured to be inaccessible outside of the black zone.

12. A computer-implemented method for protecting a data exchange on a network from malicious attack, the method being executed on a computing device having at least a black zone and comprising:

receiving a client hello message from a client; transmitting, to the client, a server hello message, wherein the server hello message comprises a certificate;

receiving, from the client, a pre-master secret message encrypted with a server public key;

storing the pre-master secret message in memory of the black zone;

protecting the black zone from malicious attacks on data by isolating hardware of the black zone;

calculating, using the pre-master secret message, a master secret in the black zone, wherein the master secret is a first session key of a first security operating mode of the computing device;

storing the master secret as a black key in the black zone;

performing any encryption or decryption operation during the first security operating mode in the black zone using the black key;

receiving, from the client, a changed cipher specification and a client finished message encrypted with a second session key of a second security operating mode of the computing device;

encrypting the black key in the black zone when the data exchange during the first session of the first security operating mode is suspended;

storing the encrypted black key in the memory of the black zone until a session associated with the first security operating mode is resumed;

generating a symmetric key for the second security operating mode of the computing device; and transmitting, to the client, a server finished message encrypted with a symmetric key in the second security operating mode of the computing device.

13. The computer-implemented method of claim 12 wherein protecting the data exchange includes protecting a transport layer security session.

14. The computer-implemented method of claim 12 wherein storing the pre-master secret in the memory of the black zone includes software executed by a processor not being able to access the black key.

15. The computer-implemented method of claim 12 wherein receiving the changed cipher specification and client finished message with the second session key includes the second session key never being stored in memory of the computing device.

16. The computer-implemented method of claim 12 wherein encrypting the black key includes the encrypted black key having more bits than a respective unencrypted black key.

17. The non-transitory computer-readable medium of claim 9 wherein all cryptographic computations are performed in the black zone.

18. The non-transitory computer-readable medium of claim 9 wherein the key encryption key is generated using a true random number generator.

* * * * *